United States Patent [19]

Barnett et al.

[11] Patent Number: 4,714,400

[45] Date of Patent: Dec. 22, 1987

[54] PLURAL ROBOTIC DRIVE

[75] Inventors: Joseph A. Barnett, Endicott; Joseph M. Gomez; William F. Green, both of Vestal; Vincent M. Lisica; Arnold B. Rosenthal, both of Vestal, all of N.Y.

[73] Assignee: IBM Corporation, Armonk, N.Y.

[21] Appl. No.: 851,509

[22] Filed: Apr. 14, 1986

[51] Int. Cl.$^4$ .............................................. B25J 9/02
[52] U.S. Cl. ...................................... 414/751; 318/38; 318/85; 318/625; 318/687; 901/9; 901/20; 901/24
[58] Field of Search ...................... 414/749, 751–753; 901/9, 16, 20, 23, 24; 318/38, 85, 625, 687, 568 M; 212/214, 216, 218, 159; 364/157, 174

[56] References Cited

U.S. PATENT DOCUMENTS

| | | | |
|---|---|---|---|
| 3,845,284 | 10/1974 | Taguchi et al. | 318/625 X |
| 3,857,075 | 12/1974 | Sawyer | 318/38 |
| 4,177,002 | 12/1979 | Motoda et al. | . |
| 4,233,740 | 11/1980 | Bunn et al. | . |
| 4,401,931 | 8/1983 | Kulterman et al. | . |
| 4,405,884 | 9/1983 | Weber | . |
| 4,420,712 | 12/1983 | Belikov et al. | 318/38 X |
| 4,422,027 | 12/1983 | Mohlere | 318/625 X |
| 4,453,221 | 6/1984 | Davis et al. | 318/568 M |
| 4,494,060 | 1/1985 | Chitayat et al. | 318/568 M |
| 4,507,598 | 3/1985 | Wakabayashi et al. | 318/687 |
| 4,509,001 | 4/1985 | Wakabayashi et al. | 318/687 |
| 4,567,415 | 1/1986 | Friederichs et al. | 318/568 M |
| 4,590,411 | 5/1986 | Kelly | 318/687 |
| 4,604,716 | 8/1986 | Kato et al. | 318/625 X |
| 4,617,498 | 10/1986 | Ruppert | 318/85 |
| 4,629,955 | 12/1986 | French et al. | 318/625 |

FOREIGN PATENT DOCUMENTS 71054 6/1977 Japan ........................... 901/16
36869 4/1978 Japan ........................... 901/16

Primary Examiner—Leslie J. Paperner
Assistant Examiner—P. McCoy Smith
Attorney, Agent, or Firm—Perman & Green

[57] ABSTRACT

A robotic system includes two joints moving a common load-bearing member along a path for positioning a load. Each joint includes a linear electric motor and a feedback loop, the latter driving the motor accurately in response to a commanded position signal, and a true position signal provided by sensor apparatus disposed alongside a track of each linear motor. Cross-coupling circuitry connects with the sensor apparatus of each joint to produce signals representing differences in positional error and in speed of the joints. The signals are injected into the feedback loops of the joints to effect a shift of power between the joints to synchronize their travel. Window comparator circuitry is employed for introduction of variable gains to the feedback loops for values of positional error and velocity which are greater than reference values in a window. Simultaneous injection of phase lead angle to the electric motors is employed for transition to a high speed mode while retaining synchronized operation of the motors.

18 Claims, 11 Drawing Figures

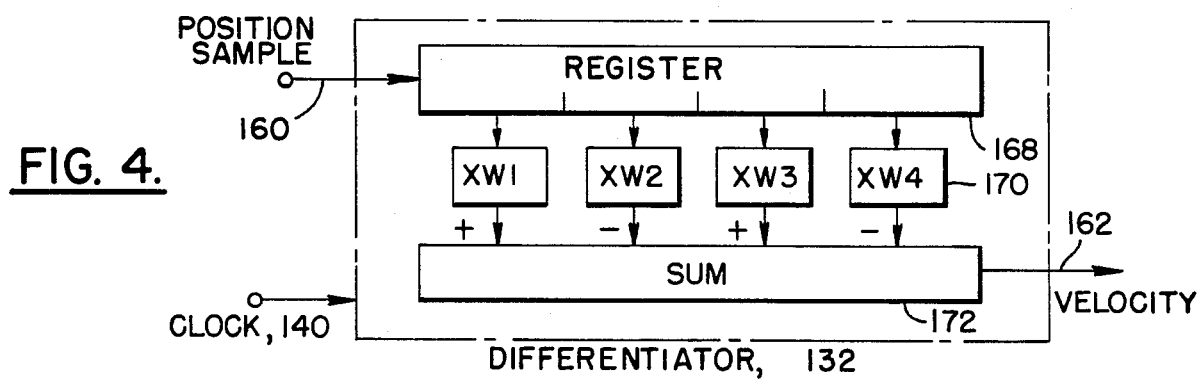
FIG. 4.
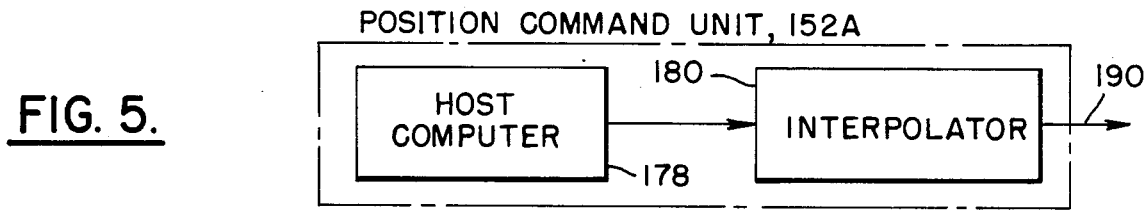
FIG. 5.
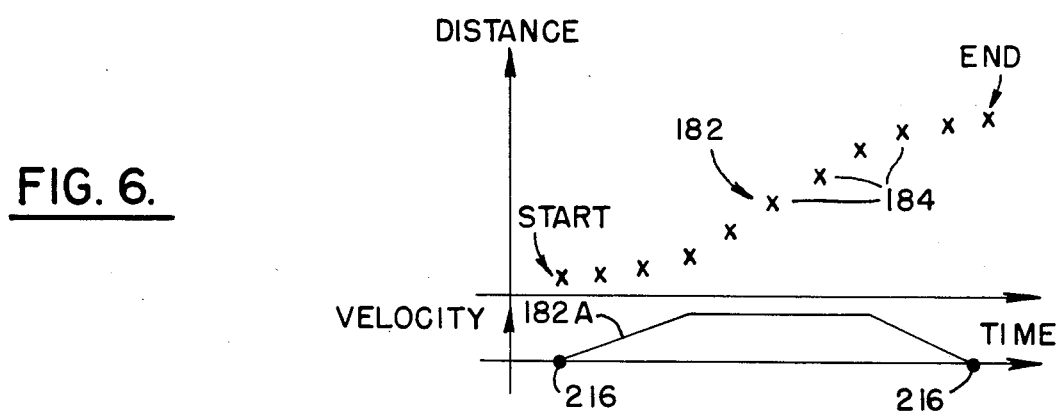
FIG. 6.
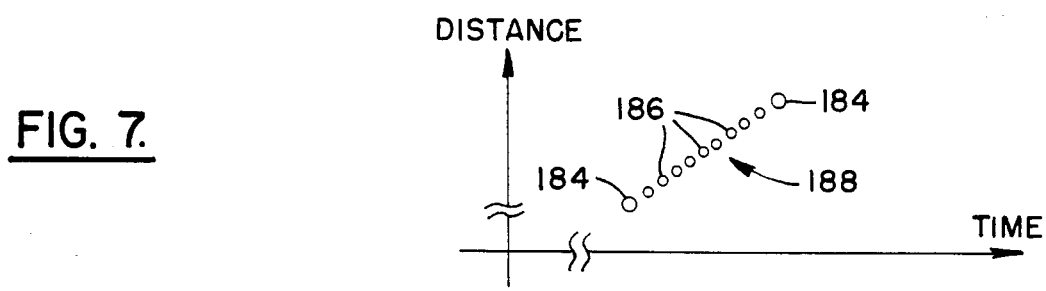
FIG. 7.
FIG. 9.
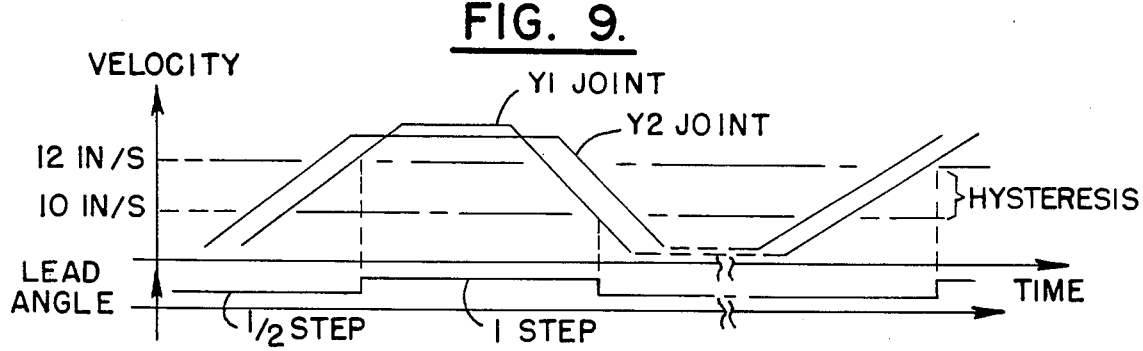

PLURAL ROBOTIC DRIVE

BACKGROUND OF THE INVENTION

This invention relates to speed control in a robot and, more particularly, to a transfer of power among plural motors driving a common joint of the robot to equalize travel of the motors.

Robots are being employed with increasing frequency for positioning a large variety of loads in industrial processes. Both speed and precision are desirable qualities in robotic tasks, the speed enabling more efficient operation and the precision enabling the robots to perform operations requiring highly precise movements.

Robots are composed of one or more members which are movable relative to a frame of reference. A member may translate, pivot to rotate relative to another of the members. Some form of prime mover, such as an electric motor, is associated with each member for providing the movement. Each movable member, including its prime mover, is frequently referred to as a joint irrespective of the type of motion which the member may undergo. A load to be positioned by the robot is held by an end effector, or gripper, extending from one of the joints.

A situation of particular interest is the case of a robot wherein a joint translates sideways as in a robot structured with joints arranged in a cartesian coordinate system. For example, a joint disposed along the X-axis may be supported by a joint which translates along the Y-axis. The X-axis joint, in turn, may support a Z-axis joint which terminates in a gripper for carrying a load. For precise positioning of the load, it is desireable that both ends of the X-axis joint move in synchronism.

A problem arises in that such synchronism has been attained by a massive interconnecting structure which minimizes bending of the X-axis joint. The use of such heavy structure is inefficient in energy consumption and increases the cost of the robot. Also, the increased weight of the joint necessitates a larger drive motor. Larger electric motors in joints are disadvantageous because of slower response times which militate against desireable rapid precise movements of a robot.

One attempt to solve the foregoing problem is the use of two electric motors, one at each end of the X-axis joint. Such a configuration can be obtained by the use of two Y-axis joints disposed at opposite ends of the X-axis joint, and supporting the X-axis joint. The two motors are advantageous in that they are smaller and have faster response times than the foregoing larger motor. However, the dynamic loading of the two motors varies during a translation of the Z-axis joint along the X-axis joint. A problem still remains in that presently available motor control systems do not compensate for changing dynamic inertial loads to provide adequate synchronism between the two motors. As a result bending of the X-axis joint may occur with a possible binding in the drives and bearings of the two Y-axis joints.

SUMMARY OF THE INVENTION

The foregoing problem is overcome and other advantages are provided in a multiple-axis robot wherein a load-bearing member, disposed along the X-axis of a cartesian coordinate system, is supported at its ends by a pair of Y-axis joints of the robot. The joints connect with the ends of the load-bearing member, and provide for translation of the load-bearing member. In accordance with the invention, each of the Y-axis joints includes a linear variable-reluctance stepping motor, and a position sensing device which provides position data along a path of travel of the joint. The sensing device includes a glass grid and, along with interpolation circuitry, provides position data which is accurate to a small fraction, smaller by some orders of magnitude, than a spacing between magnetic pole pieces of the motor to attain high positional accuracy in the joint. The robot has motor-control circuitry comprising a feedback control loops coupled to respective ones of the position sensing devices for driving the motor of each Y-axis joint with great precision.

In accordance with a further feature of the invention, the motor-control circuitry of the robot includes a cross-coupled control between the motors of the two joints. The cross-coupled loop acts as a power distribution circuit which can shift power between the Y-axis joints so as to advance or retard the progress of one joint relative to the other joint, thereby to maintain synchronism in travel of the joints along their respective paths. The cross-coupled loop is responsive to a difference in the positions sensed by the sensing devices of the Y-axis joints, and to a difference in velocities of the joints. The velocities are obtained by differentiation of position data reported by the sensing devices. By use of both position and velocity data of each joint, the power can be shifted accurately between joints so as to correctly compensate for any difference of travel along their respective paths.

In a preferred embodiment of the invention, the load-bearing member is formed as a joint disposed along the X-axis. The robot comprises further a joint disposed along the Z-axis and carried by the X axis joint, the Z-axis joint being translatable along the X-axis by the X-axis joint. The Z-axis terminates in a gripper which is rotatably mounted to the Z-axis. The gripper is operative for holding a load. This provides four degrees of freedom, namely, the three axes of the coordinate system and the rotation of the gripper.

Measurement of position is done at each of the Y-axis joints. The use of the two Y-axis joints inhibits bending of the X-axis load-bearing member as compared to previous use of only a single cantilevered joint. Thereby, the actual location of the load agrees with the measured position to a much higher degree of accuracy than has been obtained heretofore.

The precise synchronism attained by the invention in the operation of the two Y-axis joints allows for a substantial reduction in the weight of the X-axis load-bearing member while maintaining correct alignment of the ends of the load-bearing member. The reduction in weight in the mechanical coupling in combination with the electrical coupling of the Y-axis joints, raises the apparent resonant frequency of the structure and allows for a faster response to attenuate any mechanical transient motions. This improves accuracy in positioning the load. The cross-coupled loop provides point by point tracking of the Y-axis joints in prescribed paths of travel whereby the Y-axis joints cooperate in the movement of the X-axis joint and the load. The cross-coupled loop compensates for differences in inertial loading of the Y-axis joints due to a shifting of position of the Z-axis joint and the load along the X axis. Also the foregoing reduction in weight provides for a more economical operation of the robot.

An additional feature of the invention enables the stepping motors of the two Y-axis joints to be operated synchronously at higher speeds by injection of additional lead phase angle as compared to the nominal amount of phase angle present at lower speeds. The phase angle is the apparent position of the magnetic field impressed by an armature of a motor relative to the position of an array of teeth of a stator of the motor. The angle is leading in the direction of motion of the armature along the stator. Shifting of phase angle introduces a shift in motor drive force. In order to insure that such a change in motor drive force does not upset the balance in the driving of the opposite ends of the X-axis load-bearing member by the two Y-axis joints, the circuitry of the invention delays the injection of a phase change until both motors have passed into a different speed range, and then alters the phase angle simultaneously in both of the motors.

BRIEF DESCRIPTION OF THE DRAWINGS

The aforementioned aspects and other features of the invention are explained in the following description, taken in connection with the accompanying drawing wherein:

FIG. 4 is a block diagram of a differentiator of FIG. 3.

FIG. 5 is a block diagram of a position command unit of FIG. 3;

FIG. 6 is a graph of a set of input position signals for the unit of FIG. 3;

FIG. 7 is a graph of a set of interpolated positions between positions of the signals of FIG. 6;

FIG. 9 is a graph of velocities of robot joints and an injection of lead phase angle to motors of the joints for demonstrating the operation, including hysteresis, of a lead angle generator of FIG. 8.

DETAILED DESCRIPTION

Figure 1A:
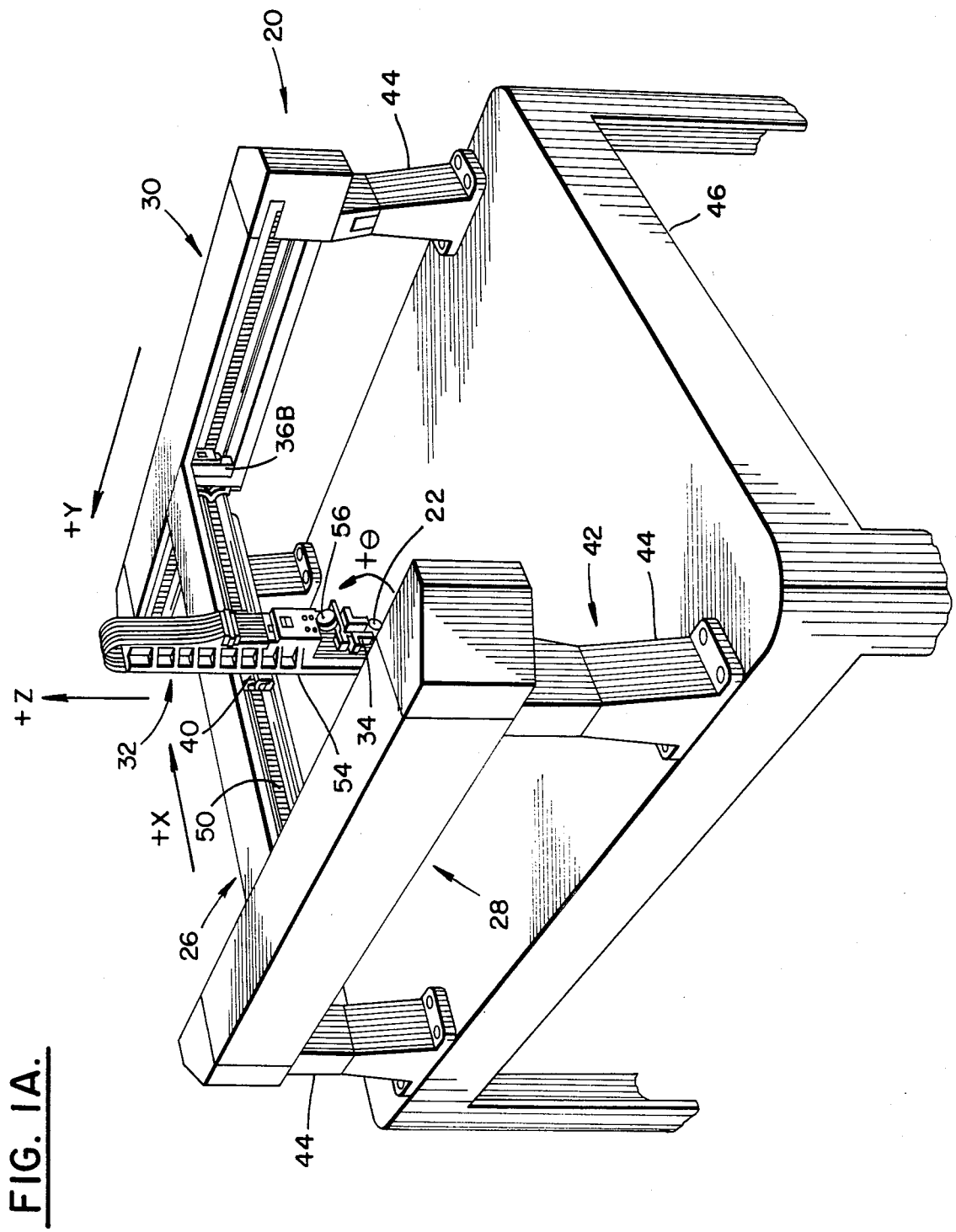
FIG. 1A is a perspective view of a multiple axis robot of the invention wherein two joints of the robot move a common load-bearing member along a path designated by a pair of side rails.
Figure 1B:
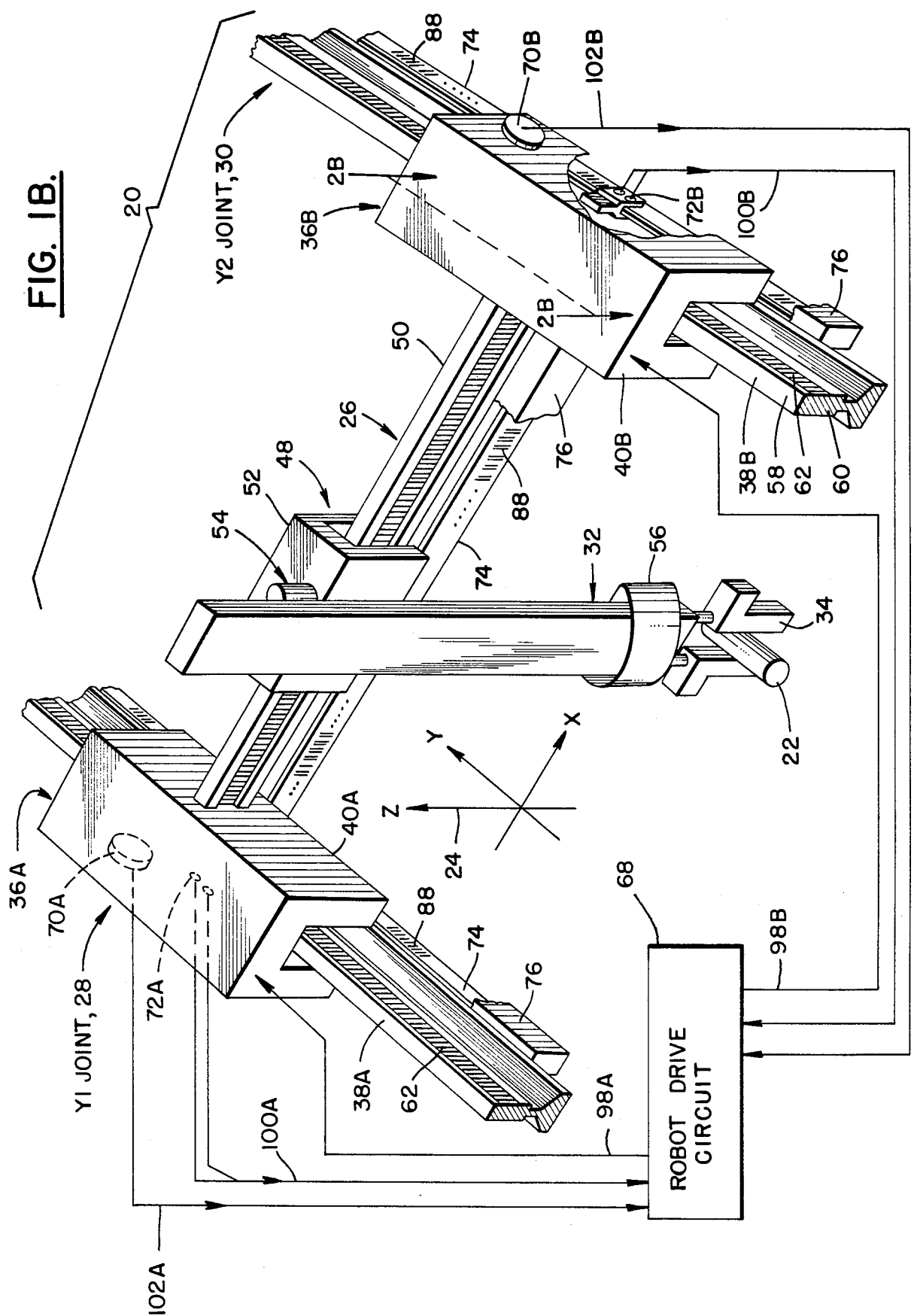
FIG. 1B is a simplified isometric view of the robot of FIG. 1A.

With reference to FIGS. 1A, 1B, 2A, and 2B, there is shown a multiple axis robot 20 having motorized drives for positioning a load 22 along X, Y, and Z axes of a cartesian coordinate system 24. The robot 20 comprises a joint 26 disposed horizontally in the X direction, two joints 28 and 30 arranged in parallel and disposed horizontally in the Y direction, a joint 32 disposed in the Z direction, and a gripper 34 extending from a lower end of the joint 32. The joints 28 and 30 are also identified by Y1 and Y2, respectively. The load 22 is held by the gripper 34, the latter being carried by the joint 32. The joint 32 is carried by the joint 26, and is operative for moving the gripper 34 vertically relative to the joint 26. The joint 26 imparts translational motion in the X direction to the joint 32 and the gripper 34. The joint 26, in turn, serves as a load bearing member and is connected at one end to the joint 28, and at the opposite end to the joint 30. The joints 28 and 30 are operative to impart translational motion to the joint 26 along with the joint 32 and the gripper 34 in the Y direction.

In accordance with the invention, the joints 28 and 30 are operated in synchronism for transporting the joint 26, the synchronous operation preventing the introduction of any bending forces between the joints 28 and 30 and the joint 26, which forces might jam the movements of the joints 28 and 30. The synchronous operation is accoplished by feedback and cross-coupled loops, as will be described subsequently, which connect with the motorized drives of the joints 28 and 30.

The motorized drives comprise electric motors, more specifically, variable-reluctance linear stepping motors 36A and 36B, respectively, in the joints 28 and 30. The steps in such a motor permit positional control of each of the joints 28 and 30 wherein movement of the joints 28 and 30 can be synchronized to a resolution finer than the step distance of the motor along an entire path of travel. The motors 36A-B comprise, respectively, stator bars 38A-B and armature housings 40A-B which ride upon the respective bars 38A-B. The bars 38A and 38B also serve as outer arms of a fixed frame 42 of the robot 20, and may be mounted by legs 44 upon a base 46. The X-axis joint 26 similarly comprises a linear stepping motor 48 having a stator bar 50 with an armature housing 52 riding thereon for imparting translation to the Z-axis joint 32. The joint 32 comprises a well-known lead screw assembly 54 for raising and lowering the gripper 34. The gripper 34 includes a rotary drive 56 to impart rotation of the gripper 34 and the load 22 relative to the joint 32.

In a preferred embodiment of the invention, the robot 20 carries a payload of approximately five pounds, the joints of the X and Z axes weigh 30 pounds, and the armature housings 40A-B of the Y1 and Y2 joints each weigh 4 pounds. The ratio of payload weight to weight of the robot is approximately 14%, this being a significant improvement over presently available ratios of approximately 4%.

Figure 2A:
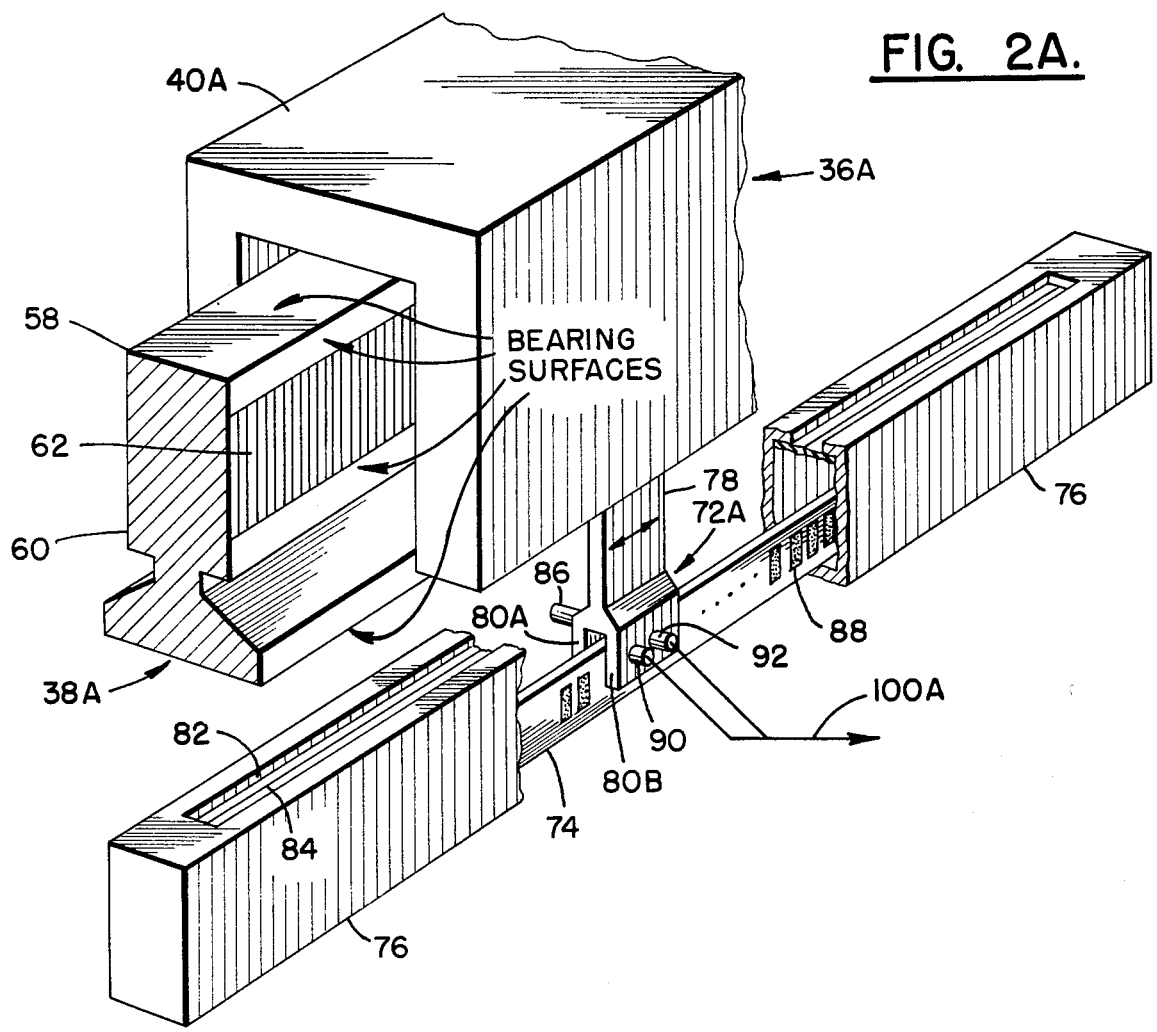
FIG. 2A is an enlarged isometric view of a stator bar of a linear motor and position sensing apparatus, shown partially diagrammatically, of a Y-axis joint of the robot of FIG. 1A.
Figure 2B:
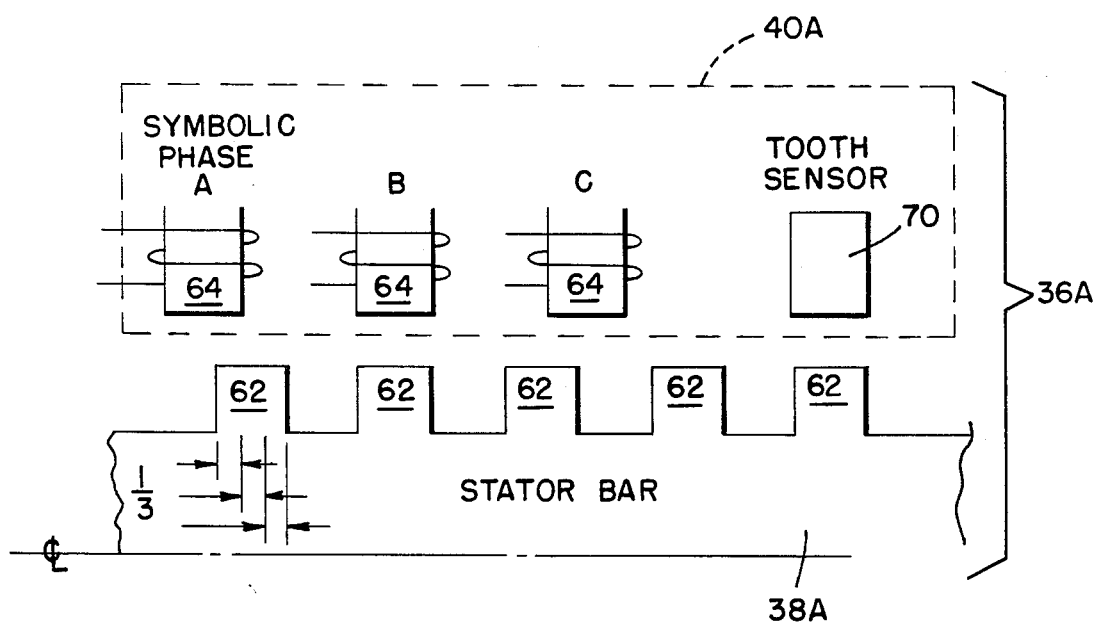
FIG. 2B is a diagrammatic view of the linear motor taken along the line 2B—2B in FIG. 2A showing a stator bar and an armature housing of the motor.

FIGS. 2A-B show details in the construction of the motor 36A. This description of the motor 36A applies also to the motor 36B which has the same construction as the motor 36A. As shown in FIG. 2A, the stator bar 38A of the motor 36A comprises upper and lower steel rails 58 and 60, each of which is provided with a smooth bearing surface for receiving bearings (not shown) of the armature housing 40A, by which bearings the housing 40A rides upon the rails 58 and 60. In a preferred embodiment of the invention, the housings 40A-B each have a length of 3 inches. The rails 58 and 60 stiffen the bar 38A for supporting the weight of the joints 26 and 32 and the load 22, while providing torsional strength to resist twisting. The cross section of the lower rail 60 is broadened for increased torsional strength, thereby to improve accuracy in positioning the load 22. The bearings are spring loaded, preferably, to insure precise alignment of the housing 40A with the bar 38A.

It is noted that the bar 38A serves the dual purposes of supporting joints of the robot 20 while also serving as a component of the motor 36A. The rails 58 and 60 are spaced apart by a set of silicon iron laminations which are pinned to the rails 58 and 60, and are also bonded to each other and to the rails to provide strength to the bar 38A. Each of the laminations is configured with a tooth and valley construction defining a set of teeth 62 for the motor 36A. The teeth 62 are arranged along the bar 38A, in a preferred embodiment of the invention, with a pitch of 0.1 inch. The width of a tooth is equal to the width of a valley, namely, 0.05 inch. The laminated construction of the bar 38A reduces the flow of eddy currents, and the attendant power loss, induced by magnetic fields in the composite structure of iron and steel.

In FIG. 2B the diagrammatic view is useful in explaining the operation of motor 36A. The armature housing 40A comprises a toothed structure (FIG. 2A), which is similar to the toothed structure of bar 38A and which defines a set of magnetic poles 64, only three of which are shown by way of example. Since the motor 36A is a variable reluctance motor, there are no permanent magnets in the motor, all magnetic fields are produced by electrical energization of coils 66 disposed about respective ones of the poles 64. The coils 66 are electrically activated with current supplied by a drive circuit 68 (shown in FIGS. 1 and 3) which provides the function of commutation for successively activating the poles 64 to develop magnetic forces between the poles 64 and individual ones of the teeth 62. The spacing between the poles 64 differs from that of the teeth 62 so as to permit emplacement of the poles 64 at positions which are optimal for applying electromagnetic forces during successive positions of the armature housing 40A for urging the armature housing 40A along the stator bar 38A.

The motor 36A further comprises a magnetoresistive detector 70A, of well-known form, which senses the presence of individual ones of the teeth 62 as they approach the poles 64 during movement of the armature housing 40A along the stator bare 38A. A corresponding detector 70B (FIG. 1) is povided within the motor 36B. Output signals of the detector 70A activate the drive circuit 68 to provide the commutating function in accordance with the positions of the teeth 62 relative to the armature housing 40A, and in accordance with the required direction of force to be exerted by the joint 28 for positioning the load 22 (FIG. 1).

FIGS. 1 and 2A also show position sensors 72A, 72B, and 72C included within respective ones of the joints 28, 30 and 26 for signaling the drive circuit 68 as to the positions of the respective joints 28, 30 and 26. The sensors 72A-C are of similar construction. A detailed view of the sensor 72A is shown in FIG. 2A; it is understood that the description of the sensor 72A applies also to the sensors 72B and 72C. Additional position sensors, not shown, are incorporated within the Z-axis joint 32 and the rotary drive 56 of the gripper 34 for signaling their respective positions.

The sensor 72A comprises a grid 74 enclosed within a protective case 76 and positioned by struts (not shown in FIG. 2A) in parallel relation to the stator bar 38A. A holder 78 extends from the armature housing 40A and has two legs 80A and 80B which envelope a portion of the grid 74. The holder 78 passes though a groove 82 with a rubber seal 84 which excludes ambient light and dirt outside the case 76 from the interior of the case 76, while permitting the holder 78 to pass back and forth along the grid upon movement of the armature housing 40A along the stator bar 38A. The material from which the grid 74 is fabricated is transparent and also has a coefficient of thermal expansion which is equal to that of the steel in the rails 58 and 60, a suitable material being Vicore glass. The leg 80A holds a lamp 86 for illuminating distance marks 88 on the grid 74. The leg 80B holds a pair of detectors 90 and 92 of light of the lamp 86, the detectors 90 and 92 being positioned for viewing the marks 88. The detectors 90 and 92 output electric signals indicating the presence and absence of a mark 88, and are spaced apart by one-quarter of the distance between successive marks 88 to provide for inphase and quadrature detection of the marks 88.

Preferably, the marks 88 are of equal widths, the width being equal to the spacing between successive ones of the marks 88. This arrangement provides that, during movement of the armature housing 40A, the inphase and quadrature signals of the detectors 90 and 92 have sine waveforms which are interpolated and converted to square waves which are then suitable for processing by digital circuitry of the drive circuit 68. As will be disclosed below with reference to FIG. 3, such circuitry includes well-known logic units 94 and counters 96 responsive to the times of occurrence of the detector signals to determine the locations of the armature housings 40A'B, and also to determine whether the armature housings 40A-B are progressing in a forward or reverse direction along the respective stator bars 38A-B. The circuitry 94 allows interpolation between the grid marks 88 to resolve distance increments and to position a joint to an accuracy of 79 millionths of an inch.

The drive circuit 68 (FIGS. 1 and 3) provides electronic activation of all the joints 26, 28, 30 and 32, as well as the gripper 34. Connection of the drive circuit 68 to the joints 26 and 32, and to the gripper 34 has been deleted from the figures to facilitate a presentation of the invention. The drive circuit 68 connects with the motors 36A-B via lines 98A-B, respectively, for imparting current command signals to the motors 36A-B. The drive circuit 68 receives position data from the sensors 72A-B via lines 100A-B, respectively, and the tooth-pole spacing in the motors 36A-B from the magnetoresistive detectors 70A-B via lines 102A-B, respectively.

In accordance with a feature of the invention, the use of the two joints 28 and 30 instead of a single joint for positioning the load 22 along the Y axis permits a significant reduction in weight of the positioning system 20. By driving the load-bearing member, namely the joint 26, from both ends by the joints 28 and 30, bending stresses in the load-bearing member can be avoided so as to negate the need for a massive rigid structure as would be required if only one joint were employed for positioning the load-bearing member along the Y axis. However, in order to take advantage of the light weight structure, it is necessary for both of the joints 28 and 30 to track each other precisely as they advance along their respective bars 38A-B. Such precise tracking prevents a bending of the load-bearing member, which bending may induce unduly high forces on the bearings with possible development of a binding of the bearings.

The accurate positioning and tracking of the joints 28 and 30 is accomplished, in accordance with the invention, by the foregoing construction of the linear motor which introduces displacement without the use of any gearing and backlash associated therewith. The drive circuit 68 includes individual feedback control loops, as will be described below, for energizing the linear motors 36A-B so as to provide for accurate movement of the joints 28 and 30 along their respective bars 38A-B.

In addition, the invention provides for improved tracking of the positions of the joints 28 and 30 by a cross coupling of signals between the two feedback loops which activate the motors 36A–B. The cross coupling includes signals obtained from positional errors of each loop plus position rate of change, or velocity, of each loop. The cross coupling raises the apparent resonant frequency of the structure of the robot 20, an effect which tends to overcome any mechanical vibrations which might otherwise be present in the structure and, thereby improves the position tracking between the two joints 28 and 30.

As will be described with reference to FIG. 3, the cross-coupled signals are introduced at summing points in the feedback control loops. The signals are algebraically summed, with positive and negative signs, so as to accomplish a distribution of power between the two loops such that more power is applied to a lagging joint and a retarding force is applied to a leading joint, depending on the position errors and velocities of the joints. This allows the lagging joint to catch up with the leading joint so as to insure proper tracking of their respective positions. Such adjustment in the relative positions of the two joints 28 and 30 supplements the position control provided to the joints individually by the feedback loops 116 and 118.

In the use of the robot 20, the position of the load 22 may be varied along the X axis such that, at times, the load 22 may be near the bar 38A while, at other times, the load 22 may be near the bar 38B. When the load 22 is positioned at equal distance between the two bars 38A–B, the joints 28 and 30 must exert equal driving forces to accelerate and decelerate the load 22 during a displacement thereof in the Y direction. However, when the load 22 is positioned at unequal distances between the bars 38A–B, different forces must be exerted by the joints 28 and 30 during such acceleration and deceleration of the load 22. As a result, the dynamic loading of the joints 28 and 30 is dependent on the position of the load 22 in the X dimension. Due to such differences in dynamic loading, the individual feedback loops may experience different positioning errors in the control of the respective joints 28 and 30. However, the cross coupling of the invention compensates for such differences in dynamic loading so as to provide for the necessary accuracy in tracking between the joints 28 and 30 so as to insure that no excessive bending stresses develop within the X-axis joint 26.

Figure 3:
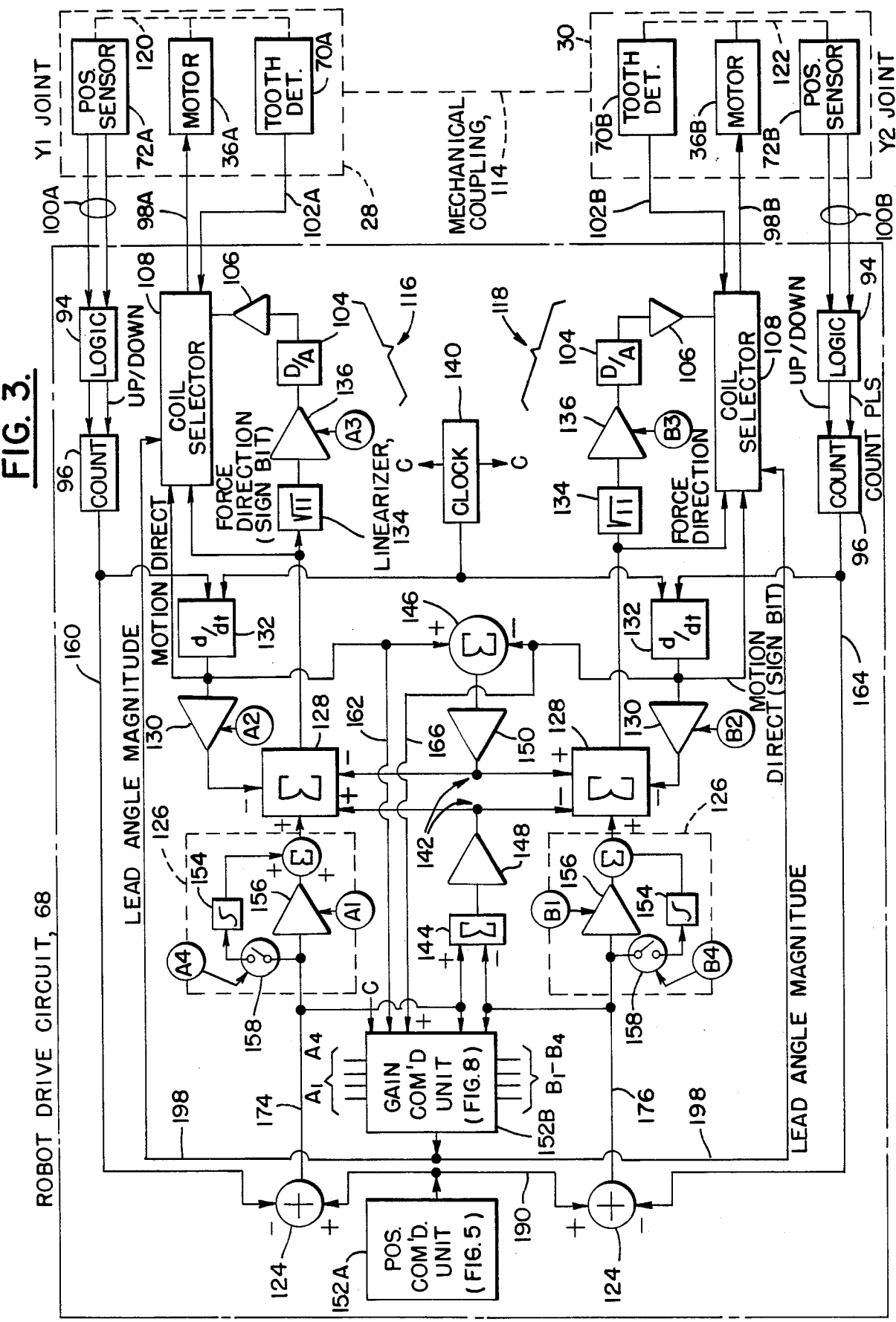
FIG. 3 is an electrical schematic diagram of circuitry of the invention including feedback and cross-coupling circuits for the robot of FIG. 1.

With reference to FIG. 3, there is provided a description of the drive circuit 68 and its interconnection with the joints 28 and 30. In the preferred embodiment of the invention, the drive circuit 68 is implemented by a digital computer which provides the various functions of signal processing such as summing, scaling, integration and differentiation of position data signals received from the sensors 72A–B. In order to facilitate an explanation of the operation of the drive circuit 68, FIG. 3 shows discrete components as are present in analog circuits, it being understood that each component represents a specific function to be performed by the computer. Thus, FIG. 3 serves as a logic flow chart for the operation of the computer, and also shows how the circuit 68 could be constructed in analog form. It is noted that the digital form of the circuit 68 is preferred in order to avoid drift.

Output digital drive signals of the circuit 68 for the motor 36A–B are converted by converters 104 to analog signals which are coupled via power amplifiers 106 to the motors 36A–B. Current from the amplifiers 106 is steered via coil selectors 108 to the requisite coils 66 for driving the motors 36A–B in a desired direction.

The mechanical interconnection of the two joints 28 and 30 is represented by a dashed line 114. The drive circuit 68 comprises two of the aforementioned feedback loops of which a first loop 116 connects via the lines 98A, 100A and 102A respectively to the motor 36A, the position sensor 72A, and the tooth detector 70A. The second loop 118 connects via the lines 98B, 100B and 102B to the motor 36B, the sensor 72B, and the tooth detector 70B. Mechanical connections between the motor 36A, the detector 70A and the sensor 72A is indicated by dashed line 120. Mechanical interconnection between the motor 36B, the detector 70B and the sensor 72B is indicated by dashed line 122.

Each of the feedback loops 116 and 118 comprises, in addition to its respective motor and sensor, a summer 124, an integration unit 126, a summer 128, an amplifier 130, a differentiator 132, a linearizing unit 134, and an amplifier 136, these components being in addition to the aforementioned logic unit 94, counter 96, digital-to-analog converter 104 and power amplifier 106. A clock 140 provides clock pulses, via terminal C, to components of the loops 116 and 118, such as the differentiator 132, for operating these components to process successive samples of position data. Such position data includes both input position commands, and present joint positions reported by the sensors 72A–B, as will be described below. The clock pulses appear periodically at intervals of 2 milliseconds, which interval is the spacing between successive samples of input position applied to the summers 124. The clock 140 participates in all operations of the robot 20 to synchronize the transmission and reading of samples of data among the components of the foregoing circuitry of the robot 20.

In accordance with a feature of the invention, the drive circuit 68 includes cross-coupling circuitry 142 connected between the two loops 116 and 118 which implements a distribution of power between the two loops 116 and 118 such that a lagging joint receives an increased amount of power while a leading joint receives a decreased amount of power. For example, in the event that the joint 28 were lagging behind the joint 30, the cross-coupling circuitry 142 would activate the loop 116 to increase the flow of power to the motor 36A while decreasing the flow of power to the motor 36B. Such shifting of power brings the two joints into registration with each other with reference to the coordinate system 24 (FIG. 1). The cross-coupling circuitry 142 comprises two summers 144 and 146, and two amplifiers 148 and 150.

Also included within the drive circuit 68 are a position command unit 152A which inputs desired joint positions to the summers 124 of the loops 116 and 118, and a gain command unit 152B which provides gain factors to amplifiers of the loops 116 and 118 via terminals A1, A2, A3 and B1, B2, B3, respectively. The gain command unit 152B also provides a lead-angle command to the Y-axis motors 36A–B as will be described below. Each of the integration units 126 comprises an integrator 154, an amplifier 156 whose output is summed with the integrator 154, and a switch 158 serially connected with the integrator 154. The switches 158 are operated by signals from the gain command unit 152B at terminals A4 and B4.

With reference also to FIG. 4 there is shown the construction of the differentiator 132 of the first loop 116. Each of the differentiators 132 have the same construction. Accordingly, this description applies also to the differentiator 132 of the loop 118. In the first loop 116, the differentiator 132 receives an input signal on line 160 from the counter 96, and outputs a signal on line 162. In the second loop 118, the differentiator 132 receives an input signal on line 164 from the counter 96 and outputs a signal on line 166. The differentiator 132 comprises a register 168, four weighting units 170, and a summer 172. Samples of input position data on line 160 are clocked into the register 168 by clock pulses at terminal C. The weighting units 170 interconnect respective cells of the register 168 to input ports of the summer 172. The weighting units 170 provide four weighting factors shown as W1, W2, W3 and W4. The most recent sample is multiplied by the factor W1, and the oldest sample is multiplied by the factor W4. Alternate ones of the weighting samples are applied to positive and negative ones of the input ports of the summer 172 as indicated in the figure. Suitable weighting factors are the following, W1=11, W2=18, W3=9 and W4=2. The summer 172 forms differences between the weighted samples, the combination of these differences being outputted as the derivative of the input position signal. Thus, the output signal of the summer 172 is the velocity of the joint 28.

In operation, the drive circuit 68 of FIG. 3 energizes the two motors 36A and 36B of the joints 28 and 30. While the two loops 116 and 118 are provided for activation of the motors 36A and 36B, respectively, it is to be understood that the two loops do not operate independently because of electrical and mechanical coupling between the two loops. Electrical coupling is provided by the cross-coupling circuitry 142 while the mechanical coupling of line 114 is provided by the connection of the load-bearing member of the joint 26 (FIG. 1) with the joints 28 and 30. Signals induced within the loops 116 and 118 by virtue of the foregoing coupling are smaller than those which would be present in each of the loops 116 and 118 if the loops could be operated independently of each other. Accordingly, the operation may be described by initially considering each of the loops 116 and 118 to have independent operation after which the effects of cross-coupling may be considered.

The positions of the joints 28 and 30, as sensed by the sensors 72A-B are outputted as counts by the counters 96. The operation is the same for both of the sensors 72A-B so that only the operation of the sensor 72A need be described, the description applying also to the sensor 72B. The counter 96 counts pulses of the signal outputted by the logic unit 94 which receives its input from sensor 72A via lines 100A (FIG. 2A). The counter 96 is initialized at a reference point of convenience on the bar 38A. The count of the counter 96 represents displacement of the housing 40A from the reference point. The counter 96 counts up or down as commanded by the logic unit 94, an upward counting indicating forward movement of the housing 40A while a downward counting indicates a reverse movement of the housing 40A. The output count of the counter 96 is a digitally formatted signal suitable for use by the driver circuit 68. The logic unit 94 outputs an up/down command to a control terminal of the counter 96 based on the time of occurrence of the inphase signal relative to the quadrature signal of the detectors 90 and 92.

In the operation of the first loop 116 by itself, the command unit 152A provides a position signal to the positive input terminal of the summer 124 while the present position derived from sensor 72A, is applied to the negative input terminal of the summer 124 along line 160. The difference between these two signals is outputted by the summer 124 via line 174 to the integration unit 126. The integration unit 126 operates in either of two modes, a terminal-phase mode in which both the integrator 154 and the amplifier 156 are employed, and a high-speed mode wherein the integrator 154 is disconnected by the switch 158.

The differentiator 132 outputs a velocity signal via the amplifier 130 to a negative input terminal of the summer 128. An output signal of the integration unit 126 is applied to a positive input terminal of the summer 128. The velocity signal serves as a damping signal for controlling stability of the loop 116. The summer 128 forms the difference between the signals of the integration unit 126 and the differentiator 132, and applies the difference to the joint 28, via the series combination of the linearizing unit 134, the amplifier 136, the converter 104, the power amplifier 106, and the coil selector 108.

The linearizing unit 134 may comprise a square-root circuit as is represented by the square-root sign shown in the figure. As is well known, the driving force provided by a motor, such as the motor 36A, is proportional to the square of the current which drives the motor. The linearizing unit 134 compensates for the squaring relationship by obtaining the square root of the absolute value of the drive signal (output of summer 128) so as to linearize the operation of the first feed back loop 116.

The foregoing current-squared relationship and the corresponding square-rooting function approximations to the motor characteristics permit an adequate amount of linearizing to be accomplished. However, it is noted that additional non-linear considerations may arise during certain optional modes of operation of the motor 36A. For example, high speed operation of the motor 36A, is accomplished by advancement or skipping of certain phases in the sequence of coil energizations. Such phase skip, when employed, is done concurrently with the two Y-axis joints 28, and 30, and is synchronized between the two joints by lead angle control from the command unit 152B as will be described below. The phase skip is employed because the electrical time-constants of the coil circuits do not permit as rapid an energization of the coils as would be required for the high speed operation. The advancement of the phase of energization of the coils in the sequence of energization partially circumvents the limitations of the time constants so as to provide a further increase in the speed of the motor 36A.

The output signal of the linearizing unit 134 is applied to the amplifier 136 to be scaled to an appropriate magnitude for driving the motor 36A. The signal outputted by the summer 128 is in digital format and includes a sign bit which is applied directly to the selector 108, the sign bit indicating whether the motor 36A is to generate force in the forward or the reverse direction. The signal outputted by the amplifier 136 is applied to the converter 104 for conversion to an analog value of current which is applied by the power amplifier 106 and the coil selector 108 to the motor 36A.

During a movement of the load 22 from one position along the Y-axis to another position along the Y-axis, the velocity imparted to the load 22, as well as to the x-axis stator bar 50, has a profile similar to that of a trapezoid in which the speed increases approximately linearly from zero to a maximum value under substantially constant acceleration, the speed then continuing at the constant value until the terminal phase in which the load 22 approaches closely to the desired position. Thereupon, the speed decreases substantially linearly with time to a value of zero. There may be some overshoot beyond the desired position in which case the Y-axis joints 28 and 30 reverse direction to bring the load 22 to the desired position.

The command unit 152A outputs a succession of updated position signals periodically at intervals of two milliseconds to the summer 124. During the interval of constant speed, the steady flow of position signals in combination with the negative feedback of the velocity signal of the differentiator 132 provide a substantially constant drive signal to the motor 36A.

The loop 116 functions as a feedback loop with respect to position control of the joint 28 in response to each of the succession of updated signals. Loop stability is attained in accordance with, well-known practice for computer-controlled feedback loops. Thus, the data sampling rate and the inherent drift resistance of a computer controlled loop enhances the loop stability. Also, if desired, a well-known lead-lag filter (not shown) can be incorporated within the amplifier 136 to provide desirable values of phase and gain margins in accordance with well-know feedback control.

The foregoing description of the loop 116 applies also to the loop 118. The operation of these loops is modified by the cross-coupling circuitry 142 in the following manner.

In the cross-coupling circuitry 142, the summer 144 connects with the output terminals of the two summers 124 to receive the positional error signals on the lines 174 and 176. The summer 144 subtracts the signal on line 176 from the signal on line 174 and outputs their difference via the amplifier 148 to each of the summers 128. The difference signal is applied to a positive input terminal of the summer 128 in the first loop 116, and to a negative input terminal of the summer 128 in the second loop 118.

The summer 146 of the cross-coupling circuitry 142 connects with output terminals of the two differentiators 132 for receiving velocity signals from each of the loops 116 and 118. The summer 146 subtracts the velocity signal of the loop 118 from the velocity signal of the loop 116, and applies their difference via the amplifier 150 to both of the summers 128. The amplifier 150 applies the difference signal to a negative input terminal of the summer 128 in the first loop 116, and to a positive input terminal of the summer 128 in the second loop 118.

The operation of the cross-coupling circuitry 142 may be demonstrated for the case wherein the joints 28 and 30 are advancing in the Y direction towards a target position. If the joint 28 were to be lagging behind the joint 30, then the positional error of the first loop on line 174 would be greater than the position error of the second loop on line 176. The summer 144 would then output a net positive correction signal to the two summers 128. In the first loop 116, the correction signal is applied to a positive input terminal of the summer 128, this providing an increased current on line 98A which increases the speed of the motor 36A. The correction signal is also applied to a negative input terminal of the summer 128 of the second loop 118 resulting in a decrease in the output current on line 98B resulting in a decrease in the speed of the motor 36B. The lagging joint 28 thereby increases its speed while the leading joint 30 thereby decreases its speed.

Similarly, it is readily seen that, by way of example, if the joint 28 is traveling at a greater speed than the joint 30, the summer 146 outputs a positive correction signal which is applied to a negative input terminal of a summer 128 in the first loop 116, and to a positive input terminal of the summer 128 in the second loop 118. This results in a decrease of the current on line 98A and an increase in the current on line 98B for a decrease in the speed of the joint 28 and an increase in the speed of the joint 30.

A further example is a situation occurring near the end of a movement of the joints 28 and 30, as the joints 28 and 30 are approaching their final positions. In this situation, one of the joints may actually be ahead of a desired intermediate goal outputted by the position command unit 152A while the other joint is behind the desired intermediate goal. The cross coupling of the two loops 116 and 118 by the summer 144 causes the leading joint to give up power to the trailing joint to allow the trailing joint to catch up to the leading joint. In addition, the effect of the cross coupling may introduce a retarding force, opposite to the direction of travel, to the leading joint dependent on the magnitudes of signals in the loops 116 and 118 as compared to the magnitude of a cross-coupling signal. Thereby, the operation of the cross-coupling circuitry 142 tends to equalize the positions of the two joints 28 and 30, and also tends to equalize the velocities of the two joints 28 and 30.

It is further noted that, due to the mechanical interconnection of the two joints 28 and 30 by the stator bar 50, the presence of a mechanical vibration in the joint 28 would be mechanically coupled to the joint 30 and, similarly, a mechanical vibration appearing on the joint 30 would be mechanically coupled to the joint 28. As a result, the stability of either of the feedback loops 116 and 118 is dependent, not only the inertia of the corresponding ones of the joints 28 and 30, but is also dependent on the inertia of the other one of the two joints, and the mechanical stiffness of the interconnection provided by the joint 26, as well as on the inertia and position of the load 22 and the joint 32 in the X dimension. The electrical operation of the cross-coupling circuitry 142 dampens mechanical vibration occurring between joints 28 and 30 and raises the apparent mechanical resonant frequency by electromagnetically stiffening the structure. It is also noted that the use of two Y-axis joints reduces bending in the X-axis stator bar 50 from that which would occur if only one Y-axis joint were employed. The reduced bending insures that the actual position of the load 22 agrees with that reported by the sensors 72A–B.

In the construction of the robot 20, the loop gains are adjusted by first stabilizing each of the loops 116 and 118 individually, and then introducing a higher-order stabilization by activation of the cross-coupling circuitry 142. In the absence of the cross-coupling circuitry 142, a maximum dynamic differential displacement of 3 mils may occur between the joints 28 and 30. Upon activation of the cross-coupling circuitry 142, the differential displacement between the two joints is reduced to less than 0.5 mil for an improvement by a factor of at least 6.

The gains of the amplifiers 156, 130, and 136 are to be selected experimentally to provide the desired scale factors for operation of the drive circuit 68 in accordance with the physical sizes and weights of the components of the robot 20. By way of example in the construction of the preferred embodiment of the invention, the gain factor inputted at terminal A1 to the amplifier 156 has a value of 3072 during the high speed operation of the motors 36A and 36B, and a value of 2048 during the terminal phase. The gain factor inputted at terminal A2 to each of the amplifiers 130 has a value of 3584 during the high speed operation of the motors 36A and 36B, and a value of 3072 during the terminal phase. The gains of the amplifiers 148 and 150 are fixed at 512 and 448, respectively during both the high speed operation and the terminal phase.

The foregoing values are significant with respect to the ratios of the gains. With respect to the gain applied to positional error via the amplifier 156, there is a drop in value of approximately ⅔ between the high speed operation and the terminal phase. A smaller change in gain is implemented with respect to the velocity damping at the amplifier 130 in each of the loops 116 and 118. The ratio of the position-error gain of amplifier 156 to the differential position-error gain of amplifier 148 is approximately 6:1 for the high operation and 4:1 for the terminal phase. In the case of the velocity damping and differential velocity-gain terms of the amplifiers 130 and 150, the ratios are approximately 8:1 in the case of high speed operation and 7:1 in the terminal phase.

The foregoing gain ratios show that the value of gain employed in the portions of the cross-coupling circuitry 142 for differential position and differential velocity are substantially smaller than the corresponding gains employed in the positional error and velocity damping in each of the loops 116 and 118. This relationship allows each of the loops 116 and 118 to be operated in accordance with well-known principles of servomechanisms and feedback control. The contribution of the cross-coupling circuitry 142, being relatively small compared to those of the positional error and velocity damping terms, permits a correction to be applied to each of the loops 116 and 118 for improved accuracy in their performance without introducing excessive complexity to the overall operation of the system 20. The equalization of position and velocity between the joints 28 and 30 by the cross-coupling circuitry 142 increases the positioning accuracy of the load 22, and also removes any excess bending and stresses within the joint 26 which would otherwise develop, thereby permitting smooth operation of the bearings joints 28 and 30.

With reference now to FIGS. 5–7, the position command unit 152A comprises a host computer 178 and an interpolator 180. A desired movement of the load 22 (FIG. 1) along the Y-axis by the joints 28 and 30 is defined in the host computer 178 by a start point and an end point as depicted in a graph 182 of FIG. 6. The graph 182 shows distance of travel along the Y-axis as a function of time. The movement is implemented at the host computer 178 by establishing a sequence of intermediate position goals 184 which are applied as input signals to the interpolator 180. The intermediate position goals 184 are spaced apart along the time axis of the graph 182 by increments of 20 milliseconds. The interpolator 180 then divides the foregoing intervals by ten to provide a set of finely-spaced position goals 186 set between the intermediate goals 184. The goals 186 are spaced apart along the time axis at increments of 2 milliseconds, as is shown in a graph 188 in FIG. 7. The graph 188 also shows distance versus time, and is a magnified view of a portion of the graph 182. The finely-spaced position goals are outputted as a sequence of signal samples by the interpolator 180 via line 190 to the summers 124 (FIG. 3).

The slope of the graph 182 represents the velocity at which the joints 28 and 30 must travel between the start point and the end point. By increasing the number of intermediate position goals 184, between the same start point and end point, while keeping the update rate at 2 msec, the host computer reduces the velocity. A decrease in the number of position goals 184 results in an increased velocity. A sufficient number of intermediate goals 184 is selected by the host computer 178 to insure that the acceleration and velocity requirement is within the capability of the robot 20. The slope of the graph 182 and the velocity are not constant, but vary from a low values near the start and the end points to higher values at the mid-portion of the path of travel. A corresponding variation in velocity occurs with respect to the finely-spaced goals 186 of the graph 188. This results in the aforementioned trapezoidal velocity profile, which profile is depicted in a graph 182A of FIG. 6, wherein the speed increases approximately linearly from zero to a maximum value, continues at the maximum value until the terminal phase, and then decreases substantially linearly with time to a value of zero.

As may be appreciated from viewing both the graphs 182 and 188, the Y1 and Y2 joints 28 and 30 move the load 22 along a prescribed path wherein the feedback loops 116 and 118 operate in response to an incremental motion plan as set forth by the finely-spaced goals 186. The finely-spaced goals 186 enable the loops 116 and 118 to update the position of the load 22 sequentially with the occurrence of each goal while maintaining relatively small positional errors for each of the joints 28 and 30. The positional error of each of the joints 28 and 30 is to be kept small enough such that the differential positional error of the cross-coupling circuitry 142 is a significant percentage of the total error. This insures that the differential effect is maintained above any background noise for optimum benefit of the cross-coupling circuitry 142.

Figure 8:
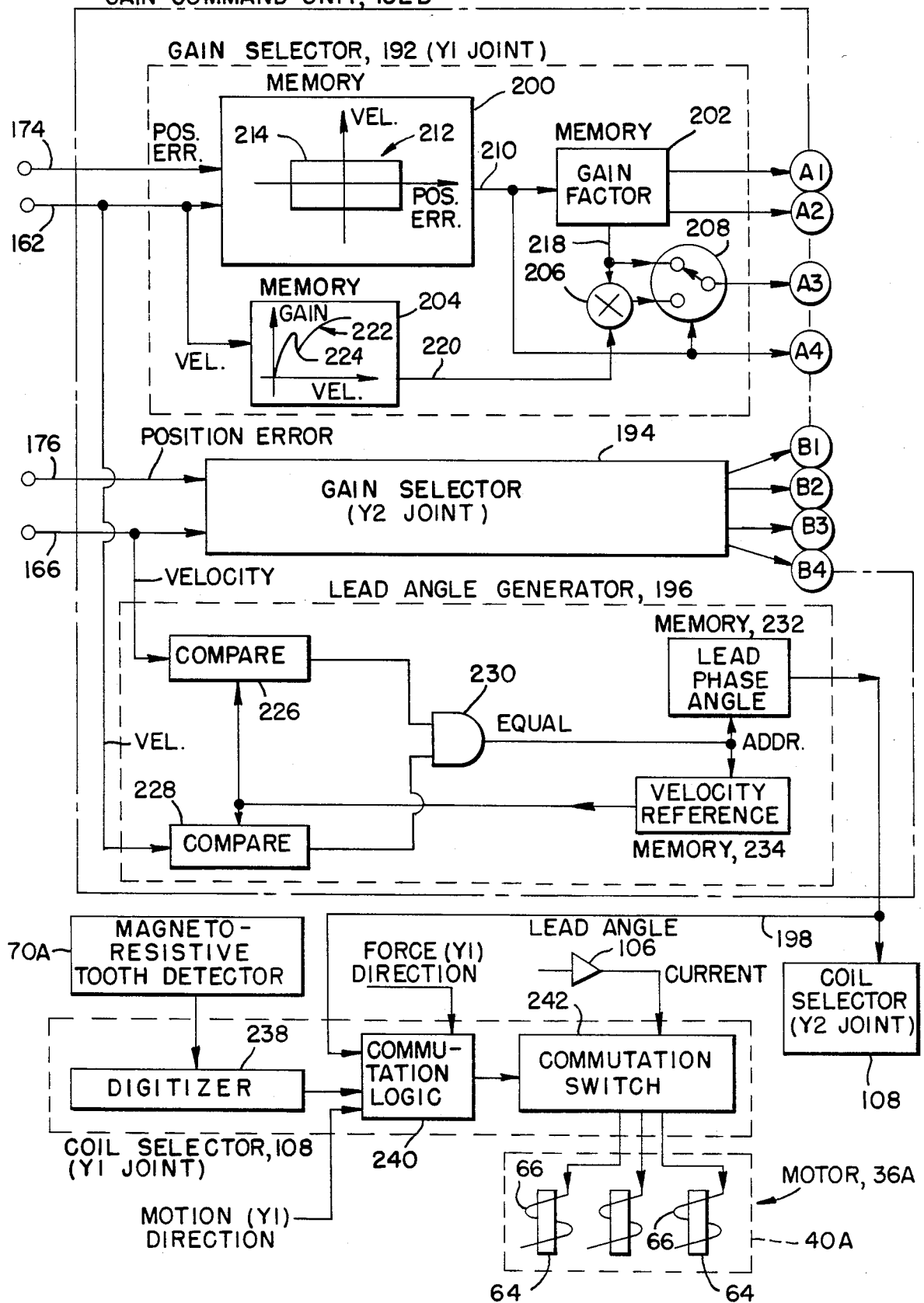
FIG. 8 is a block diagram of a gain command unit of FIG. 3.

FIG. 8 shows a block diagram of the gain command unit 152B of FIG. 3, the gain command unit 152B comprising a gain selector 192 for use in control of the Y1 joint 28, a gain selector 194 for use in control of the Y2 joint 30, and a lead angle generator 196 for use in control of both of the joints 28 and 30. The gain selectors 192 and 194 have the same construction; accordingly, only the gain selector 192 will be described in detail, it being understood that the description applies also to the gain selector 194. The gain selector 192 receives input position-error and velocity signals on lines 174 and 162, and outputs gain control signals at terminals A1, A2, A3 and a switch control signal at terminal A4. Similarly, the gain selector 194 receives input position-error and velocity signals on lines 176 and 166, and outputs gain control signals at terminals B1, B2, B3 and a switch control signal at terminal B4. The lead angle generator 196 receives the foregoing input velocity signals on lines 162 and 166, and outputs a lead-angle magnitude command signal on line 198 to each of the coil selectors 108. The sign of the velocity signal provides the motion direction input to coil selector 108.

The gain selector 192 comprises memories 200, 202 and 204, a multiplier 206, and a switch 208. In operation, the memory 202 outputs the gain control signals at terminals A1 and A2 to the corresponding terminals of the amplifiers 156 and 130 (FIG. 3) in response to receipt of an address on line 210 from the memory 200. A graph 212, shown within the block of the memory 200, depicts the operation of the memory 200. In the graph 212, velocity is plotted along the vertical axis, and positional error is plotted along the horizontal axis. A central rectangle or window 214 encloses a region representing a condition of operation of the Y1 joint 28 wherein both the positional error and the velocity of the joint have relatively small values, these values being less than 0.02 inch and 1.0 inch per second, respectively, in the preferred embodiment of the invention. Such speeds within the window 214 are much smaller than, for example, the speed of 12 inches per second at which a phase advance is to be made in the operation of the Y-axis motors 36A-B (as well as in the X-axis motor 48). The small value of velocity, within the window 214, is represented in the graph 182A (FIG. 6) by circles 216.

The memory 200 is addressed by the signals on lines 174 and 162, the addressing selecting points in the graph 212. In response to an addressing of points within the window 214, the memory 200 directs the memory 202 to output two gain control signals at the terminals A1 and A2 for control of gain in the amplifiers 156 and 130, respectively, (FIG. 3). The memory 202 also outputs a gain control signal on line 218 to the multiplier 206 and the switch 208 for control of the amplifier 136. The memory 200 also operates the switch 208 to place it in the position shown (FIG. 8) for coupling the gain control signal from line 218 to terminal A3, and operates the switch 158 (FIG. 3) via terminal A4 to activate the integrator 154.

In response to an addressing of points outside the window 214, the memory 200 directs the memory 202 to output the high-speed gain control signals via terminals A1 and A2 to the amplifiers 156 and 130. The switch 158 is opened to disconnect the integrator 154, and to place the switch 208 in the alternate position for coupling an output terminal of the multiplier 206 to terminal A3. Also, a high-speed gain control signal is outputted by the memory 202 on line 218.

The memory 204 is addressed by the velocity signal on line 162, and outputs a gain correction factor via line 220 to the multiplier 206. A graph 222, shown within the block of the memory 204, depicts a variation in the gain control factor as a function of velocity, which variation is stored in the memory 204. The gain control factor varies from a value of 0.25 at low speed to a value of 1.0 at high speed to compensate for reduced gain of the motors 36A-B at higher velocities. A dip in the graph 222 is located at 224 to reflect the increased motor gain which occurs upon an advancement in the lead phase angle at a speed of 12 inches per second. The multiplier 206 multiplies the gain factor on line 218 by the variable gain correction term on line 220, and outputs the product via the switch 208 to terminal A3. The memory 204 has no effect on the operation of the joints 28 and 30 at the low velocities and positional errors within the window 214 because the multiplier 206 is disconnected from terminal A3 by the switch 208. It is only for larger values of velocity and positional errors falling outside the window 214 that the switch 208 connects the multiplier 206 to terminal A3. The opposite situation applies to the above-noted operation of the integrator 154, namely, the switch 158 is operated by the signal on line 210 from the memory 200 to connect the integrator 154 during the presence of velocity and positional error signals within the window 214 and to disconnect the integrator 154 for larger values of velocity and positional error signals falling outside the window 214.

The lead angle generator 196 comprises three comparators 226, 228 and 230, two memories 232 and 234, and a gate 236. The comparators 226 and 228 each have one input terminal connected respectively to the velocity signals on lines 166 and 162, and a second input terminal which receives a reference signal outputted by the memory 234. The comparator 230 has two input terminals coupled respectively to output terminals of the comparators 226 and 228. The output of AND gate 230 to addresses both of the memories 232 and 234. The memory 232 is responsive to a one bit address of the output signal of the comparator 226 to provide either of two lead angles via line 198 to adjust the phase relationship between the armature currents and the teeth locations of the motors 36A-B. The adjustment of the phase is accomplished at the coil selectors 108.

With reference also to FIG. 2B, the phase angle and the lead angle are further explained as follows. In the construction of the motors 36A-B, three sets of coils 66 are provided. The coils in each set are wired in series (not shown) for simultaneous excitation and are considered to be phases. For example, if the phases are identified by the letters A, B and C, a successive excitation of the sets of coils is accomplished in half steps by commutation as follows: A, AB, B, BC, C, CA and back to A. A phase advance in the direction of motion of, for example, one step, creates a force which urges the armature housing 40A or 40B in the direction of motion, while a phase shift in the opposite direction exerts a retarding force to slow the movement of the housing 40A or 40B.

In operation, the adjustment of the lead angle is in accordance with speed of operation of the joints 28 and 30 and follows a hysteresis pattern as may be understood with reference to FIGS. 8 and 9. The reference signal outputted by the memory 234 is initially set at a value of 12 inches per second. The lead angle outputted by the memory 232 is initially set at ½ steps, wherein a step is equal to ⅓ distance between centers of adjacent teeth 62 (FIGS. 2B). As the velocities of the joints 28 and 30 increase past the value of the reference signal, the comparators 226 and 228 output logic-1 signals. The AND gate 230 outputs a logic-1 signal if and only if both input signals are one. When both of the comparators 226 and 228 are outputting logic-1 signals, the AND gate 230 passes a logic-1 signal to address inputs of memories 232 and 234. Thereupon, the memory 232 outputs a lead angle of 1 step, and the memory 234 outputs a reference velocity of 10 inches per second.

During a subsequent slowing of the motors 36A-B, the comparators 228 and 226 output logic-0 signals when the velocities of the respective joints 28 and 30 drop below 10 inches per second, this being the value of the reference signal. When either of the comparators 226 or 228 are outputting logic-0, the AND gate 230 then outputs a logic-0 signal to address the memories 232 and 234. Thereupon, both of the memories 232 and 234 revert to outputting their original signals, the memory 232 outputting a lead angle of ½ step, and the memory 234 outputting a reference of 12 inches per second. During a subsequent increase in the velocities of the joints 28 and 30, the foregoing procedure repeats. The two joint velocities are shown in the upper traces of the graph of FIG. 9, while the value of the lead angle is plotted in the lower trace of the graph.

The following inventive features are noted. Hysteresis is present in that there is a difference of 2 inches per second between the trigger speeds for a change in lead angle, depending on whether the joint velocities are increasing or decreasing. Also, no transition in lead angle takes place unless joints 28 and 30 have shifted to a new speed range. This prevents any unnecessary transitions in lead angle in the event that the joint velocities are maintained in the vicinity of a transition speed. Furthermore, the changes in lead angle are made simultaneously in both of the joints 28 and 30 to maintain complete synchronism in their respective movements.

Also shown in FIG. 8 is a block diagram of one of the coil selectors 108 and its connections to the magnetoresistive tooth detector 70A and the armature housing 40A of the motor 36A in the joint 28, and to the lead angle generator 196. The other one of the coil selectors 108 is similarly connected to the corresponding components (not shown in FIG. 8) of the joint 30. Since both of the coil selectors 108 are of the same construction, only one of them is to be described, it being understood that the description applies to both of the coil selectors 108. The coil selector 108 comprises a digitizer 238, commutation logic and a commutation switch 242.

In operation, the tooth detector 70A comprises a set of three magnetoresistive sensors (not shown) held by the armature housing 40A in a straight line parallel to the line of teeth 62 (FIG. 2A) of the stator bar 38A and spaced apart from each other by spacings of one-third the periodicity of the teeth 62. Thereby, the tooth detector 70A outputs a well-known three-phase analog signal of which the components are spaced apart electrically by 120 degrees. The three components give the relative mechanical position between the poles 64 and the teeth 62 unambiguously. The digitizer 238 comprises well-known analog-to digital converters and logic (not shown) for converting the components of the analog signal of the detector 70A to digital format, and for extracting the mechanical phase angle in digital format.

The digitally formatted phase angle of the digitizer 238 is processed with the magnitude of the lead angle on line 198, and direction of force control and direction of motion signals (see FIG. 3 and FIG. 8) by the commutation logic 240. The direction of motion is derived from the sign of the velocity signal (obtained from block 132) and is used to determine the direction in which the "lead angle" is to be applied. The direction of force is not to be confused with the direction of motion. The direction of force can be opposite to the direction of motion as is the case when a retarding force is required to slow the motor. The direction of force is obtained from the sign bit of the output signal of the summer 128 (FIG. 3) in the loop 116 of the Y1 joint. Motor current from the amplifier 106 of the loop 116 is coupled via the commutation switch 242 to the requisite set or sets of the coils 66 of the motor 36A. The commutation switch 242 operates in response to the output of commutation logic 240 to energize the requisite coils 66 of the motor 36A. As the armature housing 40A advances along the stator bar 38A, the digitally formatted mechanical phase angle changes in accordance with the changing position of the poles 64, upon which the coils 66 are wound, relative to the position of the teeth 62. The motors 36A-B can be operated at still higher speeds with the injection of larger amounts of lead angle to the commutation logic 240. This can be accomplished by use of a further lead angle generator (not shown) with the comparators and memories thereof being set at higher values of velocities for outputting an additional increment in phase angle to the commutation logic 240.

The foregoing physical arrangement of the robot 20 with the pair of joints 28 and 30 carrying the transversely positioned joint 26 provides for a substantial reduction in overall weight of the moving components of the robot without a reduction in the load-carrying capacity of the robot. This physical arrangement of the robot increases positional accuracy by reducing bending of the transverse joint 26 which carries the load, the increased positional accuracy being maintained even with a shifting in position of the load along the joint 26. While individual feedback loops 116 and 118 are employed for for driving each of the joints 28 and 30 to each of a sequence of closely spaced positional goals, the use of cross coupling circuitry injects an additional component to the loop error signals based on differences in positional error and velocity for more precise synchronization of the joints 28 and 30. Also, the synchronized injection of lead phase angle to the excitation of the joint motors 36A and 36B enables the motors to operate at higher speeds while retaining synchronism during the lead angle injection.

It is to be understood that the above described embodiment of the invention is illustrative only and that modifications thereof may occur to those skilled in the art. Accordingly, this invention is not to be regarded as limited to the embodiment disclosed herein, but is to be limited only as defined by the appended claims.

What is claimed is:

1. A robotic system comprising:
a beam for the support of a load, said beam having first and second ends;
a first rail and a second rail spaced apart from said first rail, said first rail supporting said first end of said beam, said second rail supporting said second end of said beam;
a first robotic joint means riding on said first rail for moving said first end of said beam along said first rail; a second robotic joint means riding on said second rail for moving said second end of said beam along said second rail;
a first sensing means for sensing a position of said first end of said beam;
a second sensing means for sensing a position of said second end of said beam, said first joint means including first circuit means responsive to a position signal of said first sensing means for applying power to said first joint means to move said first beam end to a first desired position, said second joint means including second circuit means responsive to a position signal of said second sensing means for applying power to said second joint means to move said second beam end to a second desired position in registration with said first desired position; and
cross-coupling circuitry connected between said first and said second circuit means, and connecting with said first and said second sensing means, for varying an amount of power applied to said first joint means relative to said second joint means to equalize positions between said first and said second ends of said beam; and wherein
said cross-coupling circuitry is responsive to a difference between velocities of said first and said second joint means, said first and said second circuit means obtaining said velocities as a rate of change in position sensed by said first sensing means and a rate of change in position sensed by said second sensing means.

2. A system according to claim 1 wherein each of said joint means comprises a linear motor having magnetic-poles spaced apart with predetermined spacings, each of said sensing means providing position measurement to finer increments than said pole spacings; and wherein said first circuit means and said second circuit means and said power distribution means includes microprocessor circuitry operating with sampling intervals which are faster than a response time of said system for moving said beam with precision to a fraction of said pole spacing.

3. A system according to claim 1 wherein said cross-coupling circuitry is responsive to a difference of position between sid first and said second ends of said beam.

4. A system according to claim 1 wherein said cross-coupling circuitry is responsive to a difference of position between said first and said second ends of said beam; and wherein said first rail and said second rail are parallel to each other with said beam extending transversely there between, each of said rails being directed in the direction of a Y axis, said beam being directed in the direction of an X axis of a coordinate system containing said Y axis, said coordinate system including a Z axis perpendicular to said X axis and said Y axis; and wherein said system further comprises a third robotic joint means for moving a load along said beam, and a fourth robotic joint means connecting with said third joint means, said third joint means beiang movable along said beam for transporting said load in the direction of said X axis, and said fourth joint means serving to move said load in the direction of said Z axis for improved ratio of weight between load and movable components of said robot, said cross-coupling circuitry and said improved weight ratio providing improved accuracy of said robot in positioning the load.

5. A system according to claim 4 wherein each of said joint means comprises a linear motor having magnetic-poles spaced apart with predetermined spacings, each of said sensing means providing position measurement to finer increments than said pole spacings; and wherein said first circuit means and said second circuit means and said power distribution means includes microprocessor circuitry operating with sampling intervals which are faster than a response time of said system for moving said beam with precision to a fraction of said pole spacing.

6. A robot comprising:
a load-supporting member;
first and second robotic joint means for driving said member along a predetermined path;
first and second sensing means for sensing position along said path respectively of said first and said second joint means, said first and said second joint means being coupled respectively to said first and said second sensing means for driving said member toward a predetermined position on said path; and
power distribution means responsive to positions sensed by said first and said second sensing means for varying an amount of power applied to said first joint means relative to said second joint means to equalize travel of said first and said second joint means along said path independently of differences in dynamic loading of the joint means associated with the position of a load relative to said load-supporting member; and wherein
each of said joint means includes a feedback loop generating an error signal formed by the difference between a position signal of a corresponding one of said sensing means and a commanded position signal, said feedback loop including summing means, and wherein said power distribution means includes velocity means for signalling a speed of movement of each of said joint means, said power distribution means including means for applying a difference of velocity signal to said summing means in each of said feedback loops for advancing and retarding a speed of movement of each of said joint means to equalize said travel.

7. A system according to claim 6 wherein each of said joint means comprises a linear motor having magnetic poles spaced apart with predetermined spacings, and wherein each of said sensing means senses position to finer position increments than said pole spacing to permit said first and said second joint means to position said load-supporting member with a precision finer than said pole spacing.

8. A robot comprising:
a load-bearing member oriented for carrying a load;
a first joint and a second joint disposed on opposite ends of said load-bearing member for transporting said load-bearing member, each of said joints including motor means for imparting motion to respective ones of said joints;
drive circuitry including a first feedback loop and a second feedback loop operatively connected to respective ones of said motor means for driving said joints from one location to another location; and wherein
said drive circuitry further comprises cross-coupling means responsive to a difference in position between said first joint and said second joint for injecting into each of said loops a positional error signal of the difference in position between said first joint and said second joint, thereby to improve synchronism between movements of said first joint and said second joint; and
said cross-coupling means includes means responsive to a difference of velocity between said first joint and said second joint for injecting into each of said loops a velocity-error signal of the difference in velocity between said first joint and said second joint, thereby to retain said synchronism under conditions of changing dynamic loading.

9. A robot according to claim 8 further comprising means for moving the load along said load-bearing member between said first joint and said second joint resulting in a variation of dynamic loading of said first joint and said second joint, said cross-coupling means improving the synchronism between movements of said first joint and said second joint under conditions of changing dynamic load.

10. A robot according to claim 9 wherein said motor means in each of said joints has a variable reluctance stepping motor having a first part and a second part operable with a predetermined phase angle between a magnetic excitation of one of said parts relative to a physical position of the other of said parts; said drive circuitry including
means for advancing the phase angle in each of said motor means; and means responsive to velocities of said first joint and said second joint for synchronizing an advance of phase angle in said first joint and said second joint in accordance with the velocities of said first joint and said second joint, thereby to retain the synchronism in movement of said first joint and said second joint during an advance of phase angle.

11. A robot according to claim 10 wherein said drive circuitry further comprises a window-comparator circuit for comparing parameters of motion of a joint with a set of reference parameters, said drive circuitry including means driven by said window-comparator circuit for altering loop gains of said first loop and said second loop in response to magnitudes of said parameters.

12. A robot according to claim 11 wherein said gain altering means includes means for introducing a gain which varies as a nonlinear function of joint velocity.

13. A robot according to claim 11 wherein said parameters of joint motion are positional error and velocity.

14. A robot according to claim 13 wherein said set of reference parameters of said window-comparator circuit includes a set of reference velocities which are smaller than a velocity at which a phase angle is advanced by said phase advancing means for said motor means.

15. A robot according to claim 14 wherein said drive circuitry includes means responsive to said window-comparator circuit for varying gains of a feedback loop during a condition wherein said motion parameters have values greater than the reference parameters within a window of said window-comparator circuit.

16. A robot according to claim 8 wherein said drive circuitry further comprises a window-comparator circuit for comparing parameters of motion of a joint with a set of reference parameters, said drive circuitry including means driven by said window-comparator circuit for altering loop gains of said first loop and said second loop in response to magnitudes of said parameters.

17. A robot according to claim 16 wherein said drive circuitry includes means responsive to said window-comparator circuit for varying gains of a feedback loop during a condition wherein said motion parameters have values greater than the reference parameters within a window of said window-comparator circuit.

18. A robot comprising:
a load-bearing member oriented for carrying a load;
a first joint and a second joint disposed on opposite ends of said load-bearing member for transporting said load-bearing member, each of said joints including motor means for imparting motion to respective ones of said joints;
drive circuitry including a first feedback loop and a second feedback loop operatively connected to respective ones of said motor means for driving said joints from one location to another location; and wherein
said drive circuitry further comprises cross-coupling means responsive to a difference in position between said first joint and said second joint for injecting into each of said loops a positional error signal of the difference in position between said first joint and said second joint, thereby to improve synchronism between movements of said first joint and said second joint; and
said drive circuitry further comprises a window-comparator circuit for comparing parameters of motion of a joint with a set of reference parameters, said drive circuitry including means driven by said window-comparator circuit for altering loop gains of said first loop and said second loop in response to magnitudes of said parameters.

* * * * *